July 5, 1960

M. V. SUSSSMAN 2,943,794

LIQUID AERATING DRINKING STRAW

Filed Nov. 29, 1957

INVENTOR.
Martin V. Sussman
BY
Shoemaker & Mattare
ATTYS.

_United States Patent Office_

2,943,794
Patented July 5, 1960

2,943,794

LIQUID AERATING DRINKING STRAW

Martin V. Sussman, 9 Thomas Drive, Monroe Park, Wilmington, Del.

Filed Nov. 29, 1957, Ser. No. 699,752

9 Claims. (Cl. 239—33)

This invention relates generally to drinking straws such as are commonly employed for imbibing beverages.

The use of tubes or straws for imbibing beverages is, of course, very old. Also the aeration of various types of beverages has been practiced for a long period of time. However, the aeration of beverages has involved the use of various types of equipment which function to introduce air or other gases into the liquid by mechanical means such as rotary beaters, stirrers or whipping devices, and the aeration of such liquids by such apparatus is more or less limited to those liquids which have been thickened in some manner by the addition of thickening agents. Where the aeration of liquids of low viscosity has been attempted, the air or other gases will not effectively remain in the liquid and also the alteration of the flavor or palatability of the liquid is not properly achieved by reason of the fact that the introduced air, where it is in the liquid in the form of bubbles, will rise quickly to the surface and escape and the beverage then reverts quickly to its initial flat state.

It is a particular object of the present invention in view of the foregoing, to provide a new and novel drinking straw which is so designed or formed that as it is used it will effect the introduction of air into the liquid being imbibed and accordingly improve or add to the palatability and flavor of the same.

In other words, it is an object of the invention to provide a straw so designed that when used air will be introduced into the liquid in such a manner as to form small bubbles which will not coalesce or run together but will retain their small form until introduced into the mouth of the drinker and as a result accomplish the desired object of improving the flavor of the liquid and the consequent pleasure of drinking the same.

Still another object is to provide a new and novel drinking straw in which the air is introduced into the liquid without the use of moving or mechanical parts in or on the straw.

Another object of the invention is to provide a new and novel method of producing drinking straws designed to effect the aeration of liquid being drawn therethrough.

Still another object of the invention is to provide a method for improving the flavor and palatability of beverages adapted to be imbibed through a drinking straw.

Other objects and advantages of the invention will become apparent as the description of the same proceeds, and the invention will be best understood from a consideration of the following detailed description taken in connection with the accompanying drawing forming part of the specification, with the understanding, however, that the invention is not confined to a strict conformity with the showing of the drawing but may be changed or modified so long as such changes or modifications mark no material departure from the salient features of the invention as expressed in the appended claims.

Figure 1:
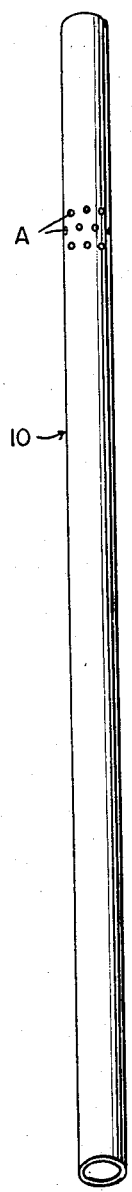
Fig. 1 is a view in perspective of a drinking straw constructed in accordance with an embodiment of the present invention wherein the air introducing means is located adjacent to the end of the straw which is placed in the mouth.

Referring now more particularly to the drawing, the numeral 10 generally designates, in Fig. 1, a drinking straw which may be made of any suitable material such as paper, coated paper, glass, plastic or the like, and in this illustration of the straw it is shown as being a seamless tube.

In accordance with the invention, the straw is provided at one end with air admission apertures which are here conventionally illustrated or not shown in any detail, because of the smallness of the illustration, and these apertures are generally designated A. These apertures are, in this construction, adjacent to the end of the straw which is taken into the mouth but are spaced from the end of the straw so that the apertures will not be covered by the lips when the straw is in use so that air can pass through to mingle with or be mixed in the liquid passing through the straw.

Figure 2:
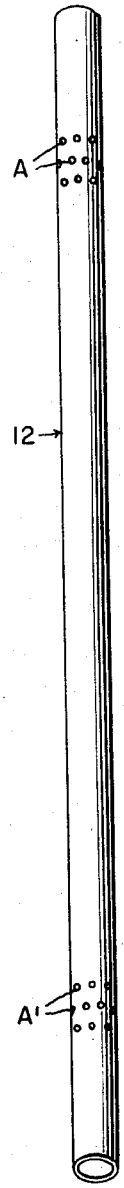
Fig. 2 is a view in perspective of a straw having air introducing means adjacent to each end whereby either end of the straw may be placed in the mouth for use.

Fig. 2 illustrates a second form of the invention in which the straw body, here designated generally by the reference character 12, has the apertures A in the wall thereof adjacent to the mouth end and at or near the opposite end the body of the straw has another group or series of apertures which are generally designated A'. In the use of the straw illustrated in Fig. 1, the end thereof opposite from the apertures A is introduced into the beverage while the opposite end is taken in the mouth in the usual manner. The aeration of the liquid as it is drawn through the straw is accomplished by the passage of air in the form of small bubbles into the liquid through the apertures A, said air passage resulting from the fact that the pressure within the straw is less than that of the air surrounding the straw, when liquid is sucked through the straw.

Preferably these apertures are located anywhere within ¼ of an inch to 3 inches of the upper or mouth end of the straw and successful aeration by the straw implies the formation of small bubbles uniformly distributed in the imbibed liquid and of uniform size.

To accomplish the desired results it has been found that the aperture size and location must be carefully controlled. An aperture of too large a size results in oversized bubbles or loss of suction, whereas too small a hole or aperture does not accomplish the aeration. As an example, and merely for the purpose of illustration and without unduly limiting the invention, where circular apertures are formed, the preferred diameter is .010 inch for a drinking straw of approximately ¼ inch diameter and .008 inch for a drinking straw of approximately 5/32 inches diameter.

Optimum aeration is accomplished by a uniform staggered distribution of from 2 to 15 holes within that part of the straw above mentioned. Preferred spacing between the holes is from .035 inch to .002 inch and hole size may range from .035 inch down to .001 inch although the preferred diameter is, as indicated above and is a function of straw diameter.

Furthermore, for special applications the optimum hole diameter is also dependent upon the viscosity of the fluid imbibed as is also hole distribution and hole number. In general, the smaller the straw diameter the smaller the aerating hole diameter.

The air admission openings or aperturers are formed in a number of different ways.

Where the straw is formed of a continuous spirally arranged strip or band of material, the air admission apertures may be provided by skips in the adhesive used for securing together the overlapping edges of the spiralled band or ribbon.

Figure 3:
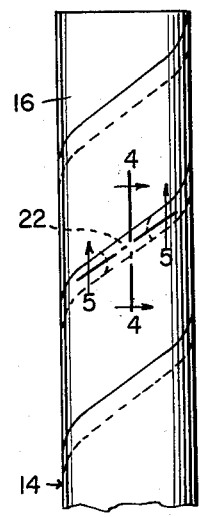
Fig. 3 is a view in side elevation of a portion of a straw of the conventional type in which the material is in the form of a spiral strip wound into a cylinder with overlapping edges and showing in this view another method of introducing air between overlapping edge portions of the strip.

In Fig. 3 there is illustrated a portion of a straw which is formed in the manner of the conventional paper soda straws, that is, by spirally wrapping a strip of the straw material and in this figure the illustrated body of the straw is generally designated 14 and the ribbon or band of the paper, plastic or other material of which the straw is made up, is designated 16.

Figure 4:
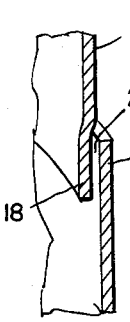
Fig. 4 is a sectional view on an enlarged scale taken substantially on the line 4—4 of Fig. 3 and showing the overlapped edges of the spiral strip separated for the passage of air therebetween.
Figure 5:
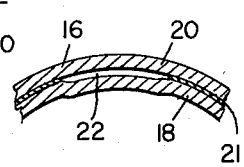
Fig. 5 is a sectional view on an enlarged scale taken substantially on the line 5—5 of Fig. 3 and showing the overlapped edges of the spiral strip separated for the passage of air therebetween.

In spiraling the band 16 to form the straw adjacent edges of the spirals are, of course, brought into overlapping relation and in Figs. 4 and 5 the reference characters 18 and 20 designate respectively the inner and outer overlapping portions of the band 16.

The overlapping portions 18 and 20 are joined together by suitable adhesive which is designated 21 and the desired air admission opening or aperture is provided either singly or in multiple by skips in the layer of adhesive 21 as indicated at 22.

In addition to forming the air admission apertures in the manner illustrated in Figs. 3 to 5, other ways may be employed as shown in detail in Figs. 6 to 11, inclusive.

The apertures may be made in the material of the straw body by piercing with a hot or cold needle, punching, shearing, electric sparking or slitting, either the finished straw body or the flat tape or ribbon material 16 before it is formed into the straw. It will, of course, be understood that in place of providing the aperture or air admission space 22 in the spirally formed straw, the ribbon material 16 may be apertured in any one of the different ways about to be described.

The aeration apertures can also take the form of straight, V or cross slits placed in the body of the straw or in the tape or ribbon prior to its being formed into the straw.

Figure 6:
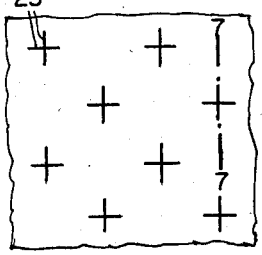
Fig. 6 illustrates in plan on an enlarged scale a portion of a tube or straw in which the air admission means is in the form of crossed or intersecting slits.
Figure 7:
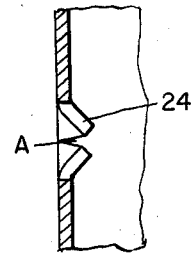
Fig. 7 is a sectional view on an enlarged scale taken substantially on the line 7—7 of Fig. 6 and showing adjacent points of the straw material directly slightly inwardly for the passage of air.

Fig. 6 illustrates the crossed slit type of aperture which will successfully aerate the liquid passing through the straw. Here the slits are designated 23 and in Fig. 7 the flaps or points of the material formed by the slits 23 are designated 24 and are shown projecting slightly inwardly so as to provide the necessary aperture A for the passage of air.

Figure 8:
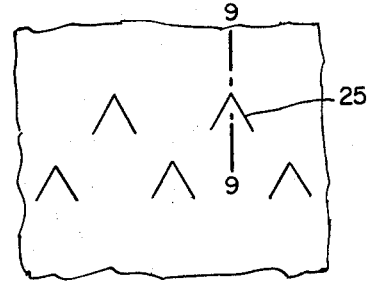
Fig. 8 is a view corresponding to Fig. 6, but showing another way of perforating the wall of the straw.
Figure 9:
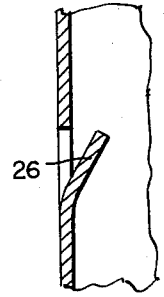
Fig. 9 is a sectional view on an enlarged scale taken substantially on the line 9—9 of Fig. 8 and showing the triangular flap disposed inwardly for the passage of air.

Figs. 8 and 9 illustrate another form of the aperture which is produced by making a V slit 25 in the material of the straw, thereby producing or forming the V-shaped flap 26 which may be initially pressed inwardly as shown in Fig. 9 or which will assume the inwardly extending position shown here when the straw is put into use. Such an action will occur where the straw is formed of thin paper or thin plastic as straws are.

Figure 10:
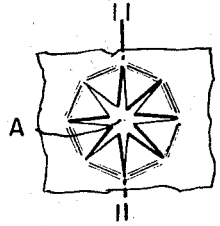
Fig. 10 illustrates in elevation a portion of a straw body and shows still another way of forming the air admitting apertures.
Figure 11:
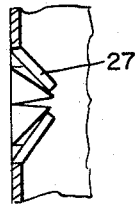
Fig. 11 is a sectional view taken substantially on the line 11—11 of Fig. 10.

Figs. 10 and 11 show a still further way of forming the air admission apertures. These apertures may be produced by the use of a punch of a suitable type which will split or cut the straw material into a number of V-shaped flaps 27 arranged with the points at the center of the opening or, in other words, the punching action will form an opening or aperture with a frayed edge resulting in the points or flaps 27. While these flaps 27 are here shown as being of regular design or the same dimensions, they may vary in size as a result of the punching operation, but there will be formed by this operation the desired air admission aperture which the reference character A designates.

It will be seen, of course, that during the imbibing of the liquids the difference in pressure between the inside of the straw and the outside will cause the joints or overlapping portions 18 and 20 and the flaps 24, 26 and 27 to separate sufficiently to admit air into the liquid where it will form in the desired small bubbles.

The advantage derived from a drinking tube or straw formed in accordance with the several embodiments of the invention is that it gives in use a novel taste to beverages somewhat similar to that achieved by conventional carbonation processes or perhaps more closely related to the effect achieved by aerating or whipping machines such as are used in the making of milk shakes. The taste, however, is different from that created by the stated techniques. When such a straw is used with plain water, it is found that the water takes on a fresh springlike flavor.

The location of the aerating apertures near the top or mouth end of the straw is important. The small aerating bubbles created by the introduction of the air into a thin, low viscosity fluid, tend to coalesce very rapidly into large bubbles which are not as effective in producing the desired flavor and palatability effects. However, by locating the apertures near the top of the straw, the air bubbles which are formed as the air is drawn into the liquid through the apertures, do not have sufficient time to coalesce after forming in the beverage and, therefore, the fluid entering the mouth and impinging upon the tongue and palate of the imbiber is an intimate combination of gases and liquid having both unique flavor and improved palatability.

The short time between the introduction of the air into the imbibed fluid and the entrance of that fluid into the mouth of the imbiber are important to this invention and contribute to the flavor effects wrought by the device claimed. In addition, the pressure within the straw is lowest near the top of the straw and as a result the location of the apertures near the top of the straw causes a greater amount of aeration than would be the case if the apertures were located lower down or in a lower portion.

As hereinbefore stated, one way of producing the apertures would be by punching the material of which the tube or straw is formed and in this operation if the material of the tube is pierced with a cold blunt tool such as a wire, the holes produced will have frayed edges which will extend into the interior of the tube in the manner illustrated in Fig. 11. These frayed edges permit the flow of air into the tube or straw but resist the back flow of liquid out of the tube, thus producing a check valve action which is conducive to good aeration.

The invention constructed in accordance with any one of the several modifications illustrated is particularly useful or efficient in improving the flavor and palatability of all beverages, particularly flavored drinks such as chocolate drinks and other non-carbonated flavored drinks. In addition, when used in carbonated beverages even though such beverages may have become somewhat flat, it increases the effect of carbonation so that the beverage will have the taste of being fully carbonated.

It is also contemplated to use the present invention in its several different forms or embodiments in conjunction with flavor containing straws such as are being presently marketed. These straws are used to flavor milk or water and contain the flavoring agents within the straw body. By altering such straws in the manner herein disclosed so as to make them aerating, the improvement of the product will be marked.

It has been hereinbefore stated that the drinking tube or straw may have the air admission apertures adjacent to both ends whereby some liquid may be drawn into the lower end while the air is introduced into the upper end. The purpose in forming the straws in this manner is that since it is desirable to have the apertures which introduce the air thereinto adjacent to the mouth end or upper end of the straw, by providing two sets of such apertures, one at either end, as shown in Fig. 2, it is unnecesary for the user to bother to differentiate between the immersed end and the mouth end of the straw. Either end of the straw can be placed in the liquid and, therefore, obviously the immersed end having apertures therein will have no part in the aerating action, the aeration being accomplished, as stated, only by the end closest to the mouth.

I claim:

1. A drinking tube having a tube wall, said tube having a plurality of air admission apertures, each defined solely by a portion of the tube wall and by an adjacent portion of the tube wall located inwardly and spaced from the adjacent outer portion of the tube wall, said portions cooperatively defining a check valve to permit air to enter the tube when liquid is drawn through the tube from the receptacle and to prevent egress of liquid through the apertures, each aperture in the tube wall having an effective area equivalent to that of a circular orifice of from 0.001 inch to 0.035 inch in diameter.

2. The tube of claim 1 in which each aperture in the tube wall has an effective area equivalent to that of a circular orifice of 0.01 inch in diameter.

3. The tube of claim 2 in which the diameter of the tube is about ¼ inch.

4. A drinking tube having a tube wall, said tube having a plurality of air admission apertures, each defined solely by a portion of the tube wall and by an adjacent portion of the tube wall located inwardly and spaced from the adjacent outer portion of the tube wall, said portions cooperatively defining a check valve to permit air to enter the tube when liquid is drawn through the tube from the receptacle and to prevent egress of liquid through the apertures, said apertures being separated from each other a distance of from 0.002 inch to 0.035 inch.

5. A drinking tube having a tube wall, said tube having a plurality of air admission apertures, each defined solely by a portion of the tube wall and by an adjacent portion of the tube wall located inwardly and spaced from the adjacent outer portion of the tube wall, said portions cooperatively defining a check valve to permit air to enter the tube when liquid is drawn through the tube from the receptacle and to prevent egress of liquid through the apertures, said tube comprising a strip of material spirally wound with overlapping edge portions joined by a bonding material, and each aperture for admitting air comprises skips in the bonding between the overlapping portions.

6. A drinking tube having a tube wall, said tube having a plurality of air admission apertures, each defined solely by a portion of the tube wall and by an adjacent portion of the tube wall located inwardly and spaced from the adjacent outer portion of the tube wall, said portions cooperatively defining a check valve to permit air to enter the tube when liquid is drawn through the tube from the receptacle and to prevent egress of liquid through the apertures, said tube having a diameter of about 5/32 inch and in which each aperture in the tube wall is equivalent to that of a circular orifice of 0.008 inch diameter.

7. A drinking tube adapted for drawing a liquid into the mouth from a receptacle, said tube being substantially smaller in diameter than the mouth of said receptacle, said tube having a number of air admission apertures in the tube wall and adjacent to one end of the tube and said apertures each being defined by at least one inwardly projecting portion of the tube material which cooperates with the tube wall to define a check valve to permit air to enter the tube when liquid is drawn through the tube from the receptacle, and prevent egress of liquid through the aperture.

8. A drinking tube adapted for drawing a liquid into the mouth from a receptacle, said tube being substantially smaller in diameter than the mouth of said receptacle, said tube having a number of air admission apertures in the tube wall and adjacent to one end of the tube and said apertures each being characterized by slits in the material of the tube providing at least one flap which projects into the tube upon reduction of pressure therein incident to the drawing of liquid therethrough and cooperates with the tube wall to define a check valve to permit air to enter the tube when liquid is drawn through the tube from the receptacle, and prevent egress of liquid through the aperture.

9. A drinking tube adapted for drawing a liquid into the mouth from a receptacle, said tube being substantially smaller in diameter than the mouth of said receptacle, said tube having a number of air admission apertures in the tube wall and adjacent to each end of the tube and said apertures each being characterized by slits in the material of the tube providing at least one flap which projects into the tube upon reduction of pressure therein incident to the drawing of liquid therethrough and cooperates with the tube wall to define a check valve to permit air to enter the tube when liquid is drawn through the tube from the receptacle, and prevent egress of liquid through the aperture.

References Cited in the file of this patent

UNITED STATES PATENTS

| 2,435,033 | Campbell | Jan. 27, 1948 |
| 2,557,411 | Butsch | June 19, 1951 |
| 2,565,679 | Dunn | Aug. 28, 1951 |
| 2,570,366 | Mitchell | Oct. 9, 1951 |